United States Patent
Toohey

(10) Patent No.: US 7,232,064 B1
(45) Date of Patent: Jun. 19, 2007

(54) DIGITAL VIDEO AUDIT SYSTEM

(75) Inventor: William Daniel Toohey, Chantilly, VA (US)

(73) Assignee: Transcore, Inc., San Diego, CA (US)

( * ) Notice: Subject to any disclaimer, the term of this patent is extended or adjusted under 35 U.S.C. 154(b) by 0 days.

(21) Appl. No.: 09/239,671

(22) Filed: Jan. 29, 1999

(51) Int. Cl.
*G07B 15/02* (2006.01)

(52) U.S. Cl. .................................................. 235/384

(58) Field of Classification Search ................ 235/384, 235/385; 348/143, 149, 150, 159, 161, 153
See application file for complete search history.

(56) References Cited

U.S. PATENT DOCUMENTS

| | | | | |
|---|---|---|---|---|
| 4,120,004 A | * | 10/1978 | Coutta ........................ 358/108 |
| 4,145,715 A | * | 3/1979 | Clever ........................ 348/150 |
| 4,337,482 A | * | 6/1982 | Coutta ........................ 348/159 |
| 4,630,110 A | * | 12/1986 | Cotton et al. ............... 348/153 |
| 4,922,339 A | * | 5/1990 | Stout et al. ................. 358/108 |
| 5,216,502 A | * | 6/1993 | Katz ........................... 348/150 |
| 5,491,511 A | * | 2/1996 | Odle ........................... 348/153 |
| 5,751,346 A | * | 5/1998 | Dozier et al. ............... 348/153 |
| 5,857,152 A | | 1/1999 | Everett ....................... 455/406 |
| 5,920,338 A | * | 7/1999 | Katz ........................... 348/150 |
| 6,042,008 A | * | 3/2000 | Ando et al. ................. 235/384 |
| 6,140,941 A | * | 10/2000 | Dwyer et al. ............... 235/384 |
| 6,366,220 B1 | * | 4/2002 | Elliott ........................ 340/928 |
| 6,574,314 B1 | * | 6/2003 | Martino .................... 379/93.17 |
| 6,583,813 B1 | * | 6/2003 | Enright et al. ............. 348/150 |

* cited by examiner

*Primary Examiner*—Daniel Stcyr
(74) *Attorney, Agent, or Firm*—Foley & Lardner LLP

(57) ABSTRACT

A method and system for building and utilizing a database containing images of transactions. As transactions are performed, a camera takes images of the transactions. These images are correlated to data that outlines the details of the transaction that includes date, time and sometimes the amount of money exchanged. The images and data are stored in a database for easy retrieval using query instructions so that a particular transaction and its corresponding image are quickly retrieved.

31 Claims, 11 Drawing Sheets

Figure 4a

Toll Plaza
Datatable  /45

| Lane | Date | Time | Collector | Unusual Occurence | Mode | Number of Axles | Trailer | Fees | Trans. No. |
|---|---|---|---|---|---|---|---|---|---|
|  |  |  |  |  |  |  |  |  |  |
|  |  |  |  |  |  |  |  |  |  |
|  |  |  |  |  |  |  |  |  |  |

Intermediate
Datatable

46 →

| Camera | Lane |
|---|---|
| 8a | 1 |
| 8a | 2 |
| 8a | 3 |
| 8b | 4 |
| 8b | 5 |
| 8b | 6 |

Figure 4b

Image Datatable

Figure 4c

| Camera | Time | Date | Image Data |
|---|---|---|---|
|  |  |  |  |
|  |  |  |  |
|  |  |  |  |

Cashier Datatable 120

| Cam./Cntr. | Date | Time | Cashier | Bar Code No. | Price | Sale | Amount of Sale | Trans. No. |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |

| Trans. No. | Pay. | Amount | Chng. |
|---|---|---|---|
|  |  |  |  |
|  |  |  |  |
|  |  |  |  |
|  |  |  |  |
|  |  |  |  |
|  |  |  |  |

Figure 12c

Image Datatable 122

| Bar Code No. | Time | Date | Image Data | Camera No. | Trans. No. |
|---|---|---|---|---|---|
|  |  |  |  |  |  |
|  |  |  |  |  |  |
|  |  |  |  |  |  |

DIGITAL VIDEO AUDIT SYSTEM

FIELD OF THE INVENTION

The present invention relates to a system and method for combining video data and transaction data so that when an audit or search is performed regarding a transaction, the relevant details around the transaction are easily obtained.

BACKGROUND OF THE INVENTION

Many companies, governments and individuals perform periodic audits. One example where an audit occurs is at toll booths. Vehicles are typically charged different rates depending on their respective sizes. A two axle vehicle is charged less than a three axle vehicle and both are charged less than a four axle vehicle, etc. Toll booth collectors must accurately collect the correct amount of money depending on the vehicle. If a toll booth collector consistently charges the incorrect amount, the municipality could see a substantial loss over a protracted period of time. Thus, an audit system is needed to check toll booth collectors and make sure they are not making consistent mistakes or worse, stealing from the municipality.

It is known in the art to provide an audit system that contains an auditing software program. This system tracks the money collected by a collector and allows for general accounting procedures to check the amounts collected. This system fails to provide a method that allows the auditor to view the vehicles as they pay their tolls. Thus, an auditor is unable to determine if the toll collector correctly collected the tolls required for each vehicle type.

The prior art also includes a system that uses a video tape surveillance system. In this system the information regarding the transaction that is generated at or by the toll collector is left separate from the video tape. In this system, there is no easy way for an auditor to look at a compilation of toll information and determine which video frames on the video tape correlate with a specific transaction. In addition, in order to view a particular transaction, the auditor must fast forward and rewind through the video tape and guess which image correlates with which transaction.

A third audit system known in the art uses a video camera to record transactions at toll booths. Typically, date time and perhaps other data, such as lane numbers, are superimposed over the video image. When an audit is performed, the auditor compares the videotape to the transactions performed. Thus, if the auditor is curious about the toll collection that occurred at 12:32 p.m. on Thursday, Dec. 3, 1998, he must fast forward and rewind the videotape to that time frame to see what transpired at the toll booth. This guess work system of locating a particular time period on a videotape is very inefficient. The auditor may spend a considerable amount of time trying to locate the specific moment in which that transaction occurs. While this system does combine both types of data onto one medium, it fails to provide an efficient method for searching out specific transactions or transactions that occurred at a specific time. Like the other prior art systems, the auditor must fast-forward and rewind through the video tape.

Similarly, banking systems have a laborious audit process. Customer transactions at teller windows are basically performed via a desktop calculator that prints onto a roll of paper. For example, if a customer desires to cash a check, the teller punches in numbers relating to both the customer's checking account number and the amount withdrawn from the account. These numbers are recorded on the roll of tape and used at the end of the day to audit the amount of money in the teller's drawer against the commercial documents (e.g., checks, deposit, withdrawal slips etc.).

This system is ineffective in that it requires the teller to punch the correct numbers onto the calculator. As no one is perfect, a teller will occasionally miss-key the information, and this will make the audit process more difficult. Also, if the auditor desires to locate a particular transaction on a day, the auditor is required to scroll through the tape in a fashion similar to forward and rewind on a video cassette recorder (VCR). This is wasteful and does not always result in the auditor locating the desired transaction.

Finally, retail stores using bar code readers and advanced cash registers can save data related to a transaction. Audits in these systems, however, are inefficient as they do not provide auditors of pictures of the items being purchased to assist in determining if the purchasers were charged the correct amount of money.

SUMMARY OF THE INVENTION

It is an object of the present invention to overcome the deficiencies noted in the prior art by providing a system and method for performing audits that allows the auditor to quickly and easily retrieve all time, money, documentation and video based information regarding a single transaction.

In addition, it is a further object of the present invention to provide a visual re-creation of the events that occur in conjunction with a toll collection so as to provide more information to the auditor to perform a more accurate audit. Additionally, this system provides a visual piece of evidence that is more difficult to rebut.

Another advantage of the present invention is the correlation of the transaction data with the video data. This allows a user of the present invention to utilize a piece of information the user knows, in order to obtain a piece of information that the user does not know. Thus, if an auditor knows the approximate time a specific transaction took place, the auditor can use this information to search and retrieve the transaction and video image data associated with that time.

Additionally, the method and system of the present invention allows for real-time monitoring of toll transactions via a monitor placed at the toll plaza. This allows an employee to monitor the toll plaza in real time.

The present invention also provides an efficient manner of correlating image, date and time data with a transaction such that specific searches on specific transactions may be performed. In addition, the present invention eliminates the need for personnel to monitor the toll booths as well as the burden and expense of recording, maintaining, transporting and storing videotapes. The present invention also allows for automatic archiving of the images and transaction data.

Also, the present invention, when implemented in a banking environment, avoids the problems noted above. Mainly, it eliminates teller error created when a teller miss-keys information. Additionally, the present invention creates a database for easy search and retrieval of a particular transaction.

Finally, the present invention may also be implemented in a retail setting where every item purchased by a consumer is imaged. The price the consumer pays for the item is compared with the store advertised price to be sure the bar code system/cashier system is working properly. In addition, an accounting takes place with the total amount the consumer pays against what the consumer was charged for the item or items purchased.

To achieve the stated and other features, advantages and objects of the present invention, an embodiment of the invention provides a system comprised of a video camera, an input device and a database management system correlates all of the relevant data.

BRIEF DESCRIPTION OF THE DRAWINGS

In the Figures:

FIGS. 4a, 4b and 4c show datatables that represent how data is stored and retrieved from the database in accordance with the present invention;

FIG. 12 shows the various datatables built by the present invention in the retail environment.

DETAILED DESCRIPTION

System Overview

Figure 1:
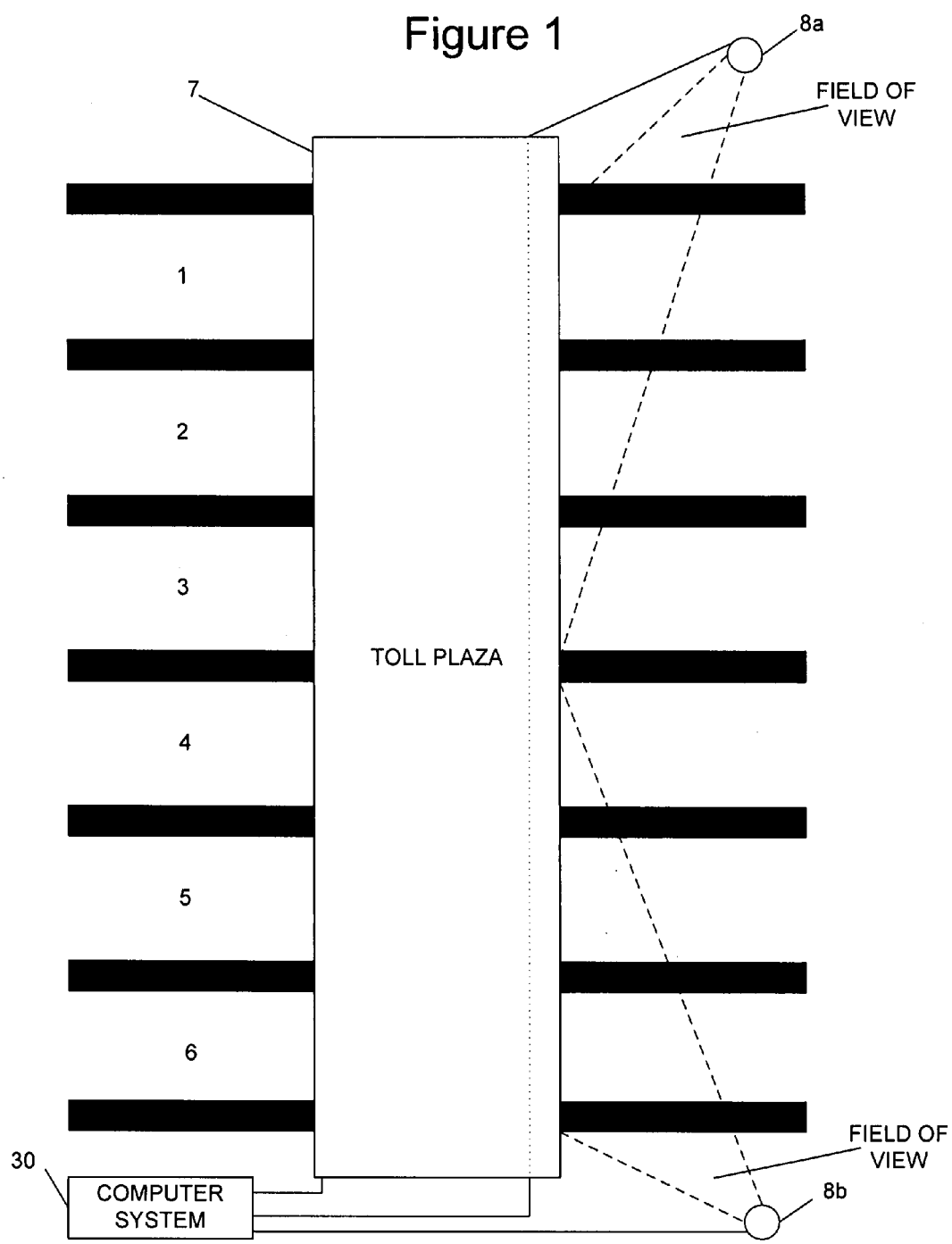
FIG. 1 is a first view of an implementation of the present invention in a toll booth environment.
Figure 2:
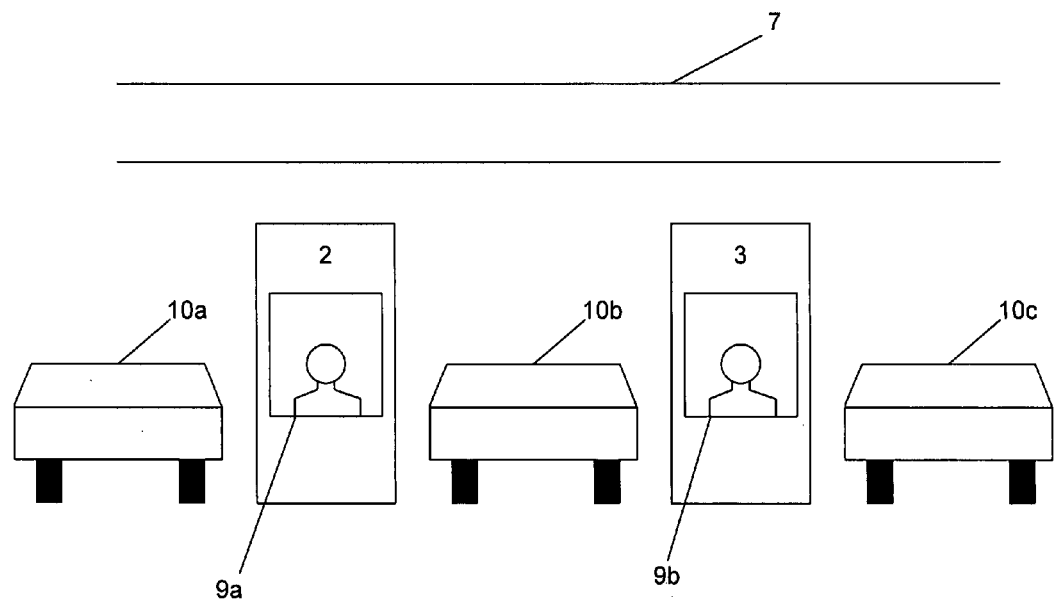
FIG. 2 is a second view of the implementation of the present invention in the toll booth environment shown in FIG. 1.

FIGS. 1 and 2 are two views of an embodiment of the present invention. Vehicles, such as motorcycles, two axle passenger cars and trucks, three axle trucks and tractor trailers travel along toll lanes 1–6. In FIG. 2, these vehicles are represented by cars 10a–10c. When these vehicles are within toll plaza 7, the driver pays a toll collector. Payment is accomplished by either having the driver hand the required money to a person 9a, 9b called the toll booth operator, throw the exact amount into a basket (not shown) or have their vehicles sensed by electronic devices, such as is used in the E-Z Pass system (also not shown). In the system that uses toll both operators as toll collectors, the toll booth operators 9a, 9b register the transactions and make data entries via specific buttons, keyboards or touchscreens and receive the money handed to them by the drivers. In the system that uses baskets as toll collectors, the change is counted either electronically, mechanically or optically, and the counting mechanisms register the transactions. In the automatic system that uses sensing devices, the drivers' cars have devices located on them that are sensed by the system, and the detection of these devices triggers a computer to deduct the toll amount from credit or debit accounts. In the automatic system that uses a transmitter located on the vehicle, the toll plaza detects the emitted wave and deducts the toll amount from an account.

At the time the toll collector registers the transaction, the video camera 8a or 8b is triggered to take a video image of a plurality of lanes, including the lane that registers the transaction. The data from the toll plaza 7 and from the cameras 8a, 8b is transmitted to the computer system 30, where the data is configured.

As shown in FIG. 1 each camera 8a, 8b produces images wide enough to encompass more than one traffic lane. Camera 8a covers lanes 1–3 while camera 8b covers lanes 4–6. It should be noted that while FIGS. 1 and 2 show two cameras covering six lanes, any combination of different numbers of cameras and lanes is possible within the teaching of the present invention. It is also within the scope of the present invention to implement a system using one camera for each lane.

Figure 3:
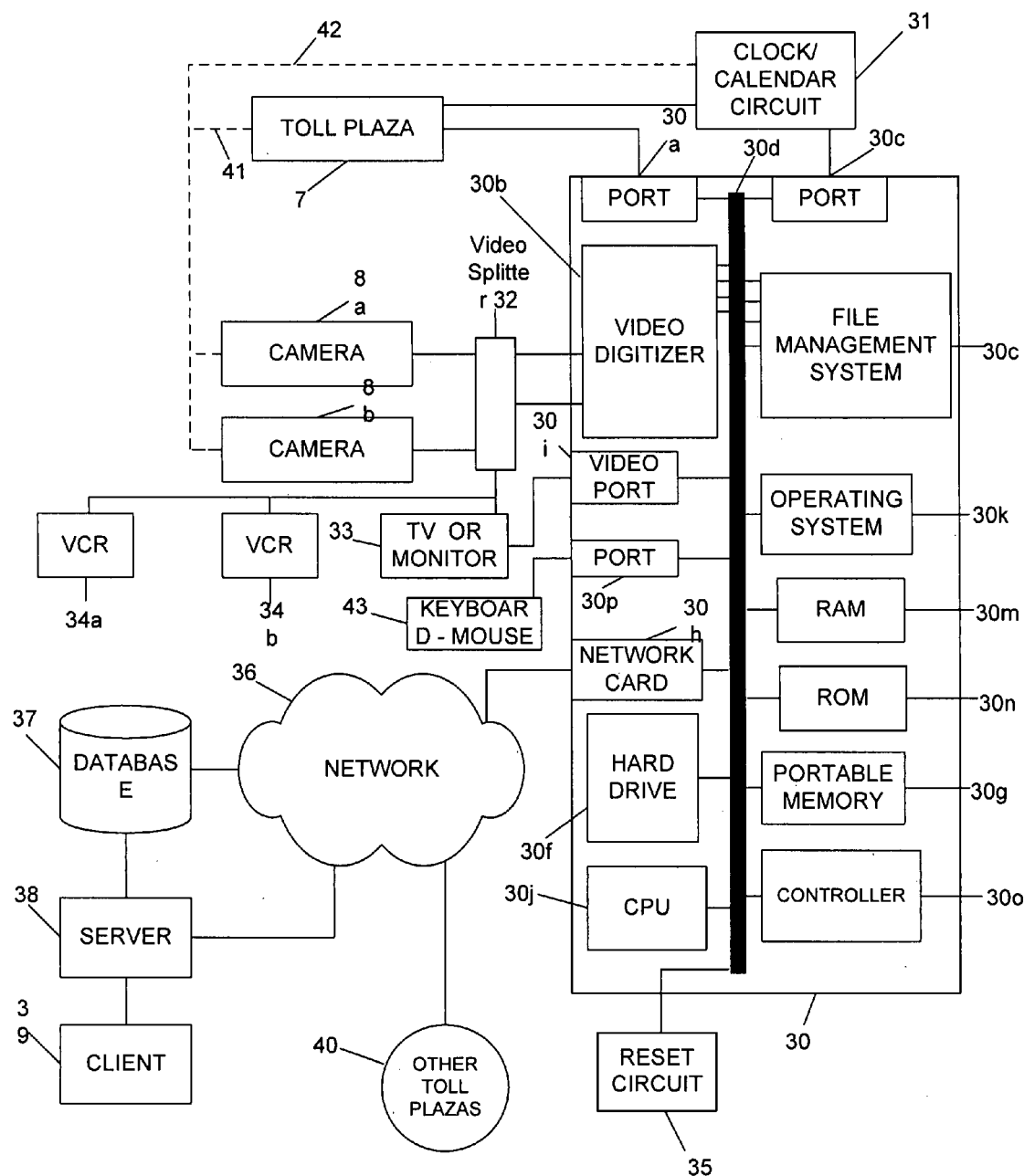
FIG. 3 is a diagram of a system for use in accordance with an embodiment of the present invention.

FIG. 3 is a detailed schematic of the system shown in FIGS. 1 and 2. Toll plaza 7 holds any single type or a plurality of types of toll collectors mentioned above. The toll collectors send data to the computer 30 via port 30a. These data signals represent the collection of money from the drivers, which is given to the toll collectors, the type of vehicle, and the time and day of the toll collection, as provided by the clock/calendar circuit 31, as well as other data as will be described further below. In a preferred embodiment, the computer system 30 is Personal Computer (PC) with a 300 Mhz processor, or better, 128 MB RAM and 54 GB hard drive using the WINDOWS NT™ operating system.

Cameras 8a, 8b typically output analog video images to computer system 30, but in an alternative embodiment they may output digital images. Video splitter 32 splits the incoming video signals so that the images from each camera 8a, 8b are forwarded to either the computer system 30, the television or monitor 33, for viewing the images in real time, VCRs 34a, 34b for recording the images, the computer system 30 or any combination thereof. Video splitter 32 also has controls so that an operator may select which camera to watch on which channel. For example, video splitter 32 may be set-up so as to output the data from camera 8a onto channel 3 of television 33 and the data from camera 8b onto channel 4 of television 33. Alternatively, video splitter 32 may have only one output, say channel 3, and the controls on the video splitter 32 dictate whether the output from camera 8a or camera 8b output is viewed on the television 33. In still another variation, the video splitter 32 is selectable so as to output both camera images so that monitor 33 displays both images on a split screen format.

The camera 8a, 8b outputs are input directly into the video digitizer 30b for converting the analog images into digital images. As noted earlier, the video digitizer 30b may be omitted if the cameras 8a, 8b output digital signals directly. The digitized images produced by the video digitizer 30b are forwarded to the bus network 30d.

In one embodiment, the video digitizer 30b is an SAIC Quad Video Digitizer, made by SAIC, connected to one peripheral component interconnect (PCI) slot. This particular video digitizer receives four analog video signals and converts them to digital video signals in parallel. This prevents backlog that would occur if a different video digitizer that could only process one video signal at a time were used to switch from camera to camera to handle a plurality of images.

Computer system 30 also receives clock and calendar data from the clock and calendar circuit 31 via port 30e. Port 30e forwards the received clock and calendar data to bus system 30d.

File Management System 30*c* receives combined data from 1) the digitized video images from the video digitizer 30*b* via bus system 30*d*, 2) the clock/calendar data from clock/calendar circuit 31 via port 30*e* and bus system 30*d* and 3) the toll plaza data from the toll plaza 7 via port 30*a* and bus system 30*d*. The File Management System 30*c* organizes the received data and forwards it for storage onto a storage medium or to another computer for real-time display. In addition, File Management System 30*c* receives queries, issues the appropriate commands and organizes the data received in response to a query so that the data may be presented to an operator in a useful format.

The first type of storage device for storing the database is hard drive 30*f*. The data organized by File Management System 30*c* is sent to the hard drive 30*f* via bus system 30*d*. Additionally, queries into the database stored on hard drive 30*f* are routed though the File Management System 30*c* via the bus system 30*d* and responses to queries from the database stored on hard drive 30*f* are routed from the hard drive 30*f* to the File Management System 30*c* via bus system 30*d*. Hard drive 30*f* holds the datatables of the database such that as new data is collected from cameras 8*a*, 8*b*, toll plaza 7 and clock/calendar circuit 31, the new data is added onto the datatables stored on hard drive 30*f* for easy search and retrieval later. Hard drive 30*f* also deletes data fields when issued the proper commands.

The second type of storage device is portable memory 30*g*. Like hard drive 30*f* described above, it continually receives data from the File Management System 30*c* via bus system 30*d*, updates the datatables stored therein and removes data, but instead the portable memory 30*g* is removable from the computer system 30. Examples of such transportable medium include digital and analog tapes, magnetic floppy disks, Iomega™ Jaz™ and Zip™ disks and semiconductor memories such smart cards, ROMs, EPROMs and EEPROMs.

The third type of storage device is centralized database 37. As the File Management System 30*c* receives and organizes the data, it forwards it directly to the centralized database 37 via the bus system 30*d*, network card 30*h* and network 36. Database 37 stores the various datatables, and makes insertions and deletions into the datatables similarly to hard drive 30*f*.

Network 36 and database 37 are also coupled to other toll plaza systems 40 for receiving similar data. An auditor uses client/server combination 39/38 to access the database 37 to retrieve information and images from any of the toll plazas connected to the centralized database 37 via network 36. In a preferred embodiment, the client/server combination 39/38 include a PC comprising a 300 MHZ processor, or better, with 128 MB of RAM and a 54 GB hard drive running on WINDOWS NT™.

Concurrently with transmitting this data to one of the storage units, the computer system 30 is also configurable to transmit combined image, toll and clock/calendar data to an operator viewing a television or a monitor 33. In this manner, an operator or auditor may view monitor 33 to receive real time images of the combined data via port 30*i* and bus system 30*d* from the File Management System 30*c*. In an alternative embodiment, real time images of the combined data are forwarded from the File Management System 30*c* to an operator or auditor viewing a client terminal via the client/server combination 39/38, network 36, network card 30*h* and the bus system 30*d*. In both embodiments, an operator or auditor views the information in real time while the collected data is collected, organized and stored on one of the storage media described.

Working with the File Management System 30*c* is Central Processing Unit (CPU) 30*j*, controller 30*o*, operating system 30*k*, RAM 30*m* and ROM 30*n*. The CPU 30*j* performs the necessary arithmetic and logic operations. Controller 30*o* issues control signals to the various units within computer system 30. The operating system 30*k* works with the controller 30*o* and the CPU 30.

In one embodiment, File Management System 30*c* is software that interacts with the operating system 30*k*, controller 30*o* and the CPU 30*j* so as generate the appropriate addresses to store and retrieve data from any memory location as well to organize the data for storage and to organize the retrieved image and transaction data so that it may be presented to the operator or auditor in a meaningful manner on either a monitor 33 or a printer (not shown). In another embodiment, the File Management System 30*c* is a hardwired card loaded with operating software that is inserted onto a slot on the computer system's board that performs the functions of address generation data organization for storage and data organization from storage to a monitor or a printer (not shown).

RAM 30*m* acts as a buffer unit and a temporary storage unit for any data or instructions as needed. ROM 30*n* holds data in a more permanent form and typically stores data used to boot the entire system as well as some camera identifying data, as will be described later.

Reset circuit 35 reboots computer system 30 if a malfunction is detected.

Database

FIGS. 4*a*–*c* are diagrams of the datatables that comprise the database. Each datatable shown is associated with a specific toll plaza. By associating unique identifiers to datatables 45 and 47 (i.e., such as a name like the "Smith Bridge"), the plurality of toll plazas may store their data at centralized database 37 and still be distinguishable from each other. Within local storage, such as hard drive 30*f*, the datatables are, by default, associated with only that toll plaza so the unique identifiers are not necessary.

FIG. 4*a* shows datatable 45, which is a representation of how the data received from the toll plaza 7 is organized within the database. The Lane field holds the lane number associated with the toll booth that collects the tolls. The Date field holds date information indicating the date of various toll collections. The Time field holds the time information indicating when each of the various tolls was collected. The Collector field holds unique identifier data indicating which toll collector accepted the money. It should be noted that the toll collector can be a person, a basket or the automatic system as described above. The Unusual Occurrence field holds data indicating whether or not something out of the ordinary occurred. An example of an unusual occurrence is the driver exiting the toll plaza too fast so as to raise an Exit Violation or if the driver has insufficient funds to pay the toll. The Mode field holds the mode data which indicates how the money is collected (e.g. manually, automatically using baskets or E-Z Pass or a mixed mode where both are used). The Number of Axles field holds data corresponding to the number of axles of the vehicle. The Trailer field holds data indicating whether or not the vehicle was towing a trailer, the Fee field holds the actual amount of money collected from the driver and the Transaction Number field assigns a unique identifier to each transaction recorded. Additional fields may also be added, but not shown, depending on the implementation of the system. These additional fields include Automatic Vehicle Classification ("AVC") Class and AVC Number of Axles. These fields are automatically filled by the toll system and they indicate the toll plaza's sensing of the type of vehicle being tolled (e.g. motorcycle vs. car vs. van) as well as the number of axles on the vehicle. These fields differ from other fields such as indicated class, not shown and indicted number of axles which the toll collector enters as the vehicle passes by. If the present invention is used in conjunction with an Electronic Toll Collection ("ETC") system, additional data such as the ETC tag serial number and ETC tag agency number, not shown, may also be added as additional fields to datatable 45.

FIG. 4*b* shows datatable 46. Datatable 46 is an intermediate datatable that is used to correlate the lane numbers with the corresponding camera covering each lane. As shown in FIG. 1, camera 8*a* covers lanes 1–3 while camera 8*b* covers lanes 4–6. This information is stored in datatable 46. This datatable is used when a query uses the lane number as a key. Datatable 46 translates the given lane number into the corresponding camera number so that the appropriate image is retrieved from datatable 47. The usefulness of the Intermediate Datatable will be described in more detail later. In one embodiment, each camera number is unique, so that different cameras in different toll plazas are separately identifiable.

In one embodiment of the present invention, the intermediate datatable is established when the computer system is installed at a particular toll plaza. Typically, the Intermediate Datatable is stored in the ROM 30*n* so that this datatable does not have to be rebuilt if there is a power loss. However, the ROM 30*n* is programmable so that changes in the number of lanes, cameras or number of lanes covered by an individual camera can easily be accommodated into datatable 46. This allows for future expansion and changes in any one toll plaza.

FIG. 4*c* shows Image Datatable 47. The Image field stores the image data captured by a video camera. In an alternative embodiment, this "image data" is simply a pointer to an address where the actual image data is stored. The Time and Date fields store the time and date when the image is recorded, respectively. The Camera field stores the unique camera identifier of the camera that captures each image stored in the image field.

Data Storage

Triggered Data Collection

Figure 5:
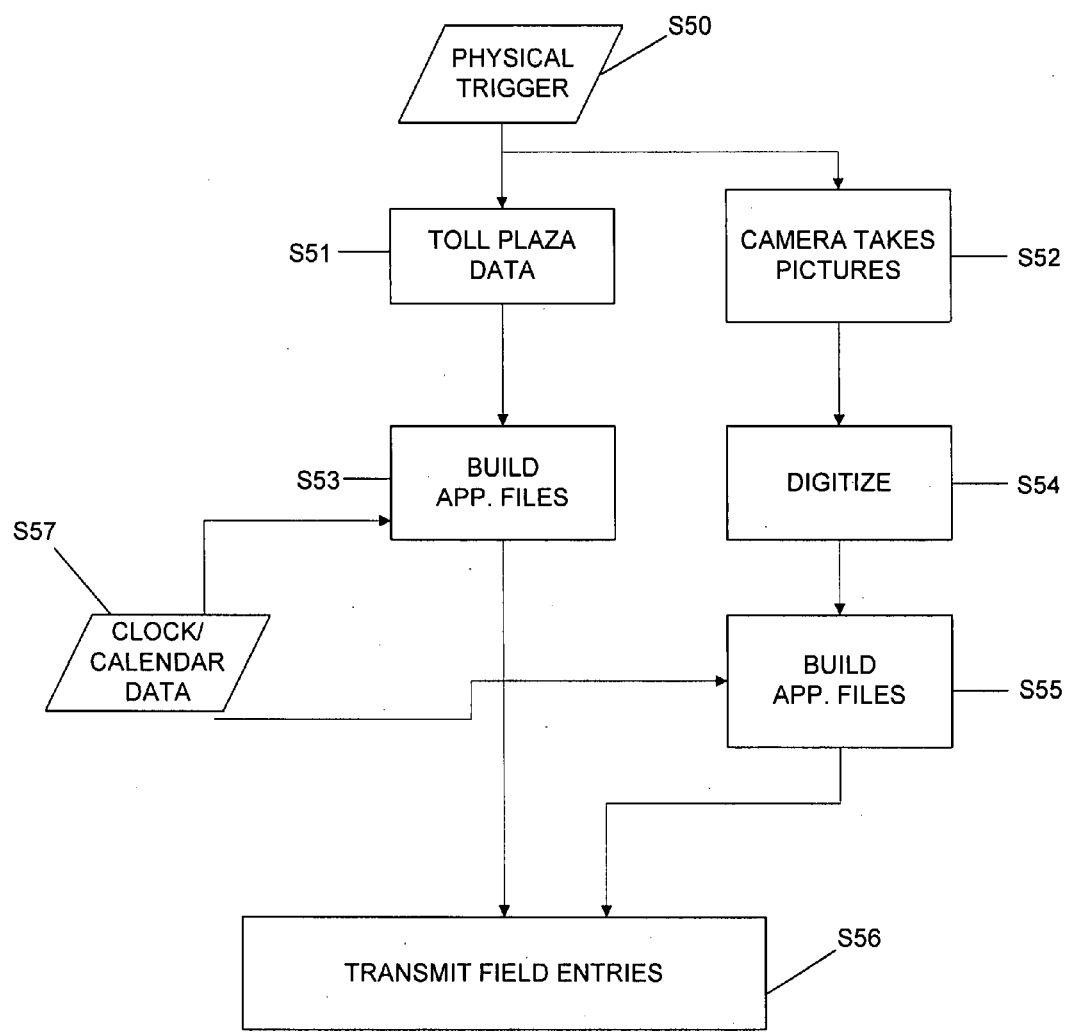
FIG. 5 is a flow diagram of a process for storing data into the database in accordance with an embodiment of the present invention.

FIG. 5 shows the method steps the system of the present invention performs in collecting and assembling all of the pertinent data in response to a trigger signal. Trigger signals differ from clock signals in that combined data is only collected and stored when an event occurs such as the weight of vehicle on a sensor, a change in magnetic flux due to the presence of a vehicle, a vehicle breaking a light or infrared beam, detecting a vehicle via sound waves or RADAR waves, registering of change in a collection basket, a toll operator striking a button for receiving money or detecting the presence of a device on a vehicle.

Depending on the trigger system, a two axle vehicle will generate two trigger signals as it passes through/over the sensors. This means that many vehicles will have two or more images captured for each transaction at the toll plaza. These images are distinguishable from each other in time in that the image created by the front axle will precede the image created by the rear axle. In this manner, there is a time difference between images so that each image in datatable 47 is still uniquely identifiable. In addition, if the Transaction Field is used, all of the images from each axle are grouped together under that unique identifier. The auditor flips between these images within a transaction as described below. For the sake of clarity, only one image is described herein for each transaction. It is within the teachings of the present invention that a plurality of images may be grouped with a single transaction.

The process begins when any of these triggering events occurs at step S50. The trigger signal is sent from the toll plaza 7 to the appropriate camera 8*a* or 8*b* via signal path 41. (Note: Signal paths 41 and 42 are shown in dotted lines because typically a system will have one or the other. The system shown is also configurable with both signal paths and switches that allow use of either the triggering mode or the clock mode.) In response to receiving this signal, the appropriate camera 8*a* or 8*b* takes an image of the lanes it covers at step S52. The image is then sent through video splitter 32 into the video digitizer 30*b* where the image is digitized and compressed at step S54. It should be noted that if the cameras 8*a*, 8*b* output digital images, this step is omitted.

At step S55, the compressed video image is forwarded to the File Management System 30*c* where additional data elements are associated with the compressed video image. More particularly, the File Management System 30*c* associates time and date data S57 obtained from the clock/calendar circuit 31 via port 30*e* that corresponds to when the image was captured. In addition, video digitizer 30*b* triggers ROM 30*n* to output preprogrammed data indicating which camera captured the image. In the embodiment described in FIG. 3, ROM 30*n* holds identifiers like "8*a*" and "8*b*" which it outputs in response to this signal from the video digitizer 30*b*.

As can be seen in FIG. 3, the video digitizer 30*b* receives a plurality of image inputs in parallel on separate input ports. Thus, as video images are digitized, the video digitizer 30*b* notes which port received each image and sends the corresponding signal to ROM 30*n* to output the corresponding unique identifier to File Management System 30*c*. The File Management System 30*c* assimilates and associates all of this data into the respective field entries of datatable 47.

Concurrently with steps S52 and S54, File Management System 30*c* collects data from toll plaza 7 and organizes it in steps S51 and S53. More particularly, at step S51, data is collected from toll plaza 7. This data includes lane identifier data, collector identifying data, a unique occurrence identifier, the mode, the number of axles on the vehicle, whether or not the vehicle has a trailer and the fees paid by the operator of the vehicle. At step S53, the data collected from toll plaza 7 is forwarded to the File Management System 30*c* along with time and date data S57 from clock/calendar circuit 31 and all of this data is associated into table entries and records for addition into datatable 45.

After the field entries for datatable 45 and 47 are assimilated and associated so as to conform into a set of searchable datatables, the File Management System 30*c* transmits the fields of data for storage or use to one or more of the following at step S56: hard drive 30*f*, network card 30*h* (which is an EtherNet card in a preferred embodiment), portable memory 30*g*, monitor 33 and client terminal 39.

By processing and storing the datatables 45 and 47 separately, the computer system 30 may more efficiently allocate resources and increase the accuracy of capturing all of the relevant data. In an alternative embodiment, the datatables 45 and 47 are processed together and stored together. Processing the two datatables together or separately also occurs in the clock trigger embodiment described below.

Clock Tick Initiates Process

Figure 6:
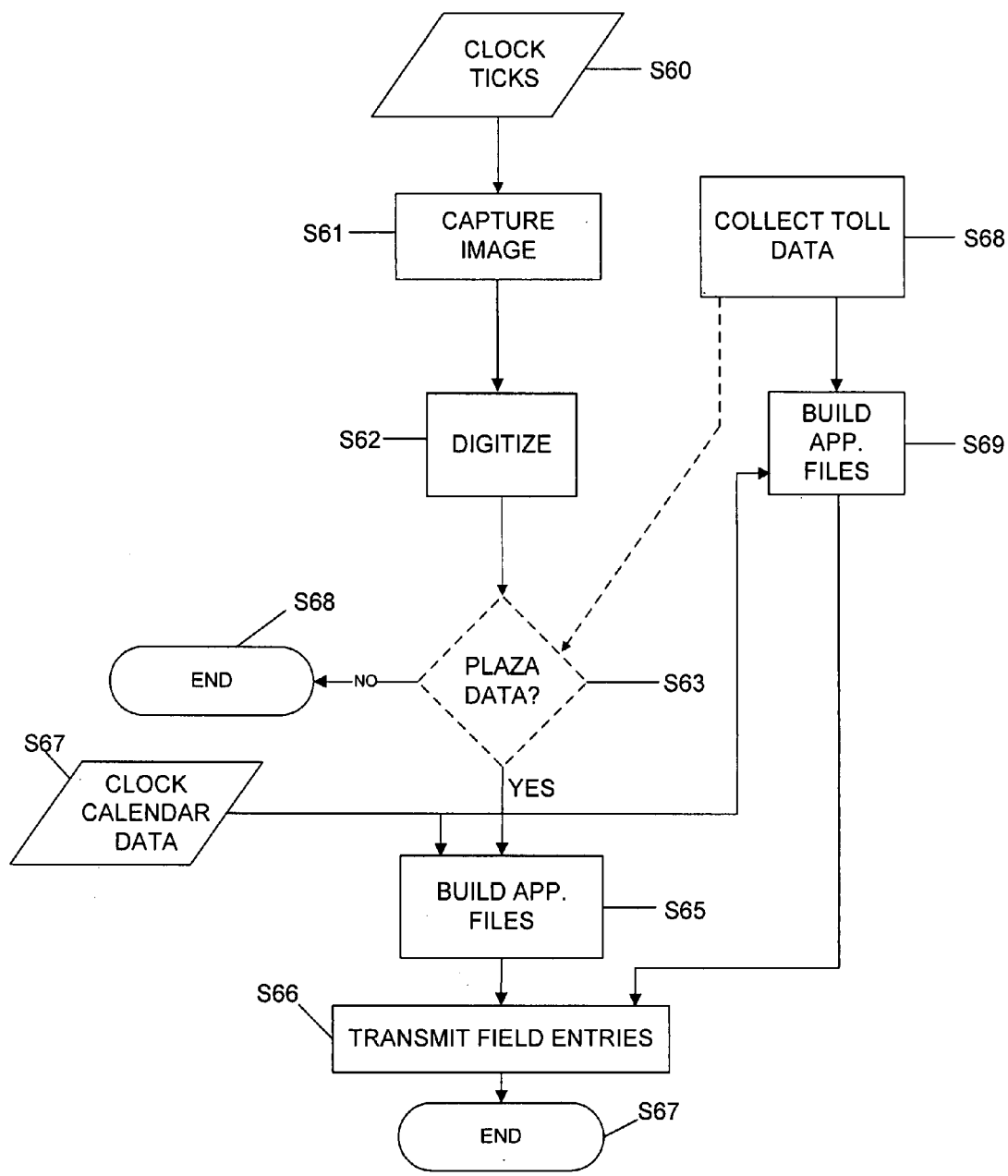
FIG. 6 is another flow diagram of another process for storing data into the database in accordance with an embodiment of the present invention.

FIG. 6 is a flow chart showing the process of another embodiment of the present invention. Like the process of FIG. 5, this process collects and organizes the data into datatables 45 and 47 except that data collection is initiated by a tick of the clock instead of a triggering event.

At step S60, the clock/calendar circuit 31 ticks. The period of the clock is adjustable so that it ticks at various intervals such as every half second, every second or once every two seconds.

The output signal from clock/calendar circuit 31 is transmitted to the cameras 8a, 8b via signal path 42 in FIG. 3. When the cameras 8a, 8b receive this signal, they each capture an image at step S61. The images are split by video splitter 32 so as to be viewable on monitor 33 and so as to be input into the video digitizer 30b. If the images are analog, the images are digitized by the video digitizer 30b at step S62. In another embodiment of the invention, the cameras 8a and 8b output digital images so that step S62 can be omitted. The digital images are forwarded to the File Management System 30c at step S63.

Step S63 is an optional process step. At step S63, it is determined if there is any data worth saving. In other words, if the image records that no vehicles paid a toll for that span of time, there is nothing of value to review later. The value of an image is determined by checking to see if a corresponding toll collection or other event occurred. Computer system 30 waits for a brief period to receive toll plaza data. If a toll collection is registered in at least one lane 1–6, a control signal is forwarded to File Manger 30c indicating that the image corresponding to the lane registering the toll collection at step S63 is to be saved. If a toll collection is not registered in the lanes corresponding to either camera 8a or 8b at that time, the File Management System 30c ENDs the process at step S68. By ending the process here, the computer system 30c does two things. First, it enables itself to accept another clock tick so as to begin the process again at step S60. Second, it does not save the image captured at step S61.

If at step S63 it is determined that the image is to be saved, File Management System 30c receives clock and date data S67 from clock/calendar circuit 31 and assimilates and organizes all of the various data fields associated with datatable 47 at step S65 as described above in conjunction with FIG. 5.

If a toll collection occurs at substantially the same time an image is captured, then the toll data is collected from toll plaza 7 at step S68. As described above, the registering of a toll collection results in a control signal being forwarded to the File Manager 30c so as to save the captured image in an alternative embodiment. After the toll plaza data is collected, it is forwarded to File Management System 30c where the toll plaza data is assimilated with time and date data S67 from clock/calendar circuit 31 into the appropriate fields of datatable 45 at step S69.

At step S66, the two sets of fields generated by File Manager 30c in steps S65 and S69 are transmitted to one or more of the following: hard drive 30f, network card 30h, portable memory 30g and monitor 33 via port 30i. After the data fields are transmitted at step S66, the process ends at step S67 and waits for another clock tick to occur at step S60.

Datatable Storage

As noted above, three of the destinations of the completed fields of data are hard drive 30f, portable storage 30g and centralized database 37 via network 36 and network card 30h.

The data fields for both datatables 45 and 47 are stored on hard drive 30f. Thus, as time progresses, the datatables 45 and 47 become larger as data is added. After a while, these two datatables are transferred, either separately or together, to centralized database 37 for data archiving purposes. The CPU 30j counts a specified time interval, say five days. The actual time period for waiting to transmit the data is a constant stored in ROM 30n. At the end of the time interval, the CPU 30j controls hard drive 30f so that it forwards all of its data to network card 30h. Destination and control headers or other information are added to the packets of datatable information so that it is transferred over network 36 to arrive at database 37 where it is stored. In a preferred embodiment, the centralized database 37 includes magnetic tape for storing images and can store three or more months worth of images.

In an alternative embodiment, long term storage and archiving is not required. In this embodiment, the data remains local on hard drive 30f. As the hard drive 30f becomes full, the data can be overwritten in a fashion that the oldest data is written over by the newest data in a circular storage fashion.

Portable memory 30g is used similarly to hard drive 30f except that it typically does not write data to database 37, even though in an alternative embodiment of the invention it can, and the portable memory 30g can be easily removed from computer system 30 and carried to another computer system where the data stored on it can be analyzed, archived or searched.

In yet another embodiment, data may be written directly to centralized database 37 via the network 36 and network card 30h. As the data fields are assimilated and organized by File Management System 30c, they are forwarded to the network card 30h. Appropriate address and header information is added so that the data is properly routed to hard drive 37 where it is stored. Also similar to the hard drive 30f embodiment described above, an operator sitting at either monitor 33 or client 39 may access the data stored on database 37 as described below.

Data Retrieval

For data retrieved, a user using keyboard 43 directly accesses the data stored on hard drive 30f. Alternatively, a user uses the client/server/network 39/38/36 combination to also obtain data from the hard drive 30f. In these embodiments, an audit, data search, data retrieval or some other function is performed by either a local operator entering data via keyboard/mouse 43 or a remote operator using the client/server/network 39/38/36 combination. In both cases, the operator is using the data stored on hard drive 30f.

In an alternative embodiment, a user uses keyboard/mouse 43 to enter commands into computer system 30. File Management System 30c receives this data entry, translates it into database-level instructions and forwards these to centralized database 37. The centralized database 37 returns data to computer system 30 where File Management System 30c organizes the data into a format for display on monitor 33.

A user may also use client/server 39/38 combination to retrieve data from centralized database 37. User uses client 39 to enter a request and forwards the request to server 38. Server 38 contains a version of File Management System 30c that translates the user's request into database instructions. The database instructions are forwarded to centralized database 37 and it returns data to server 38. Server 38 organizes the data into a format the client 39 can display to the user.

Figure 7:
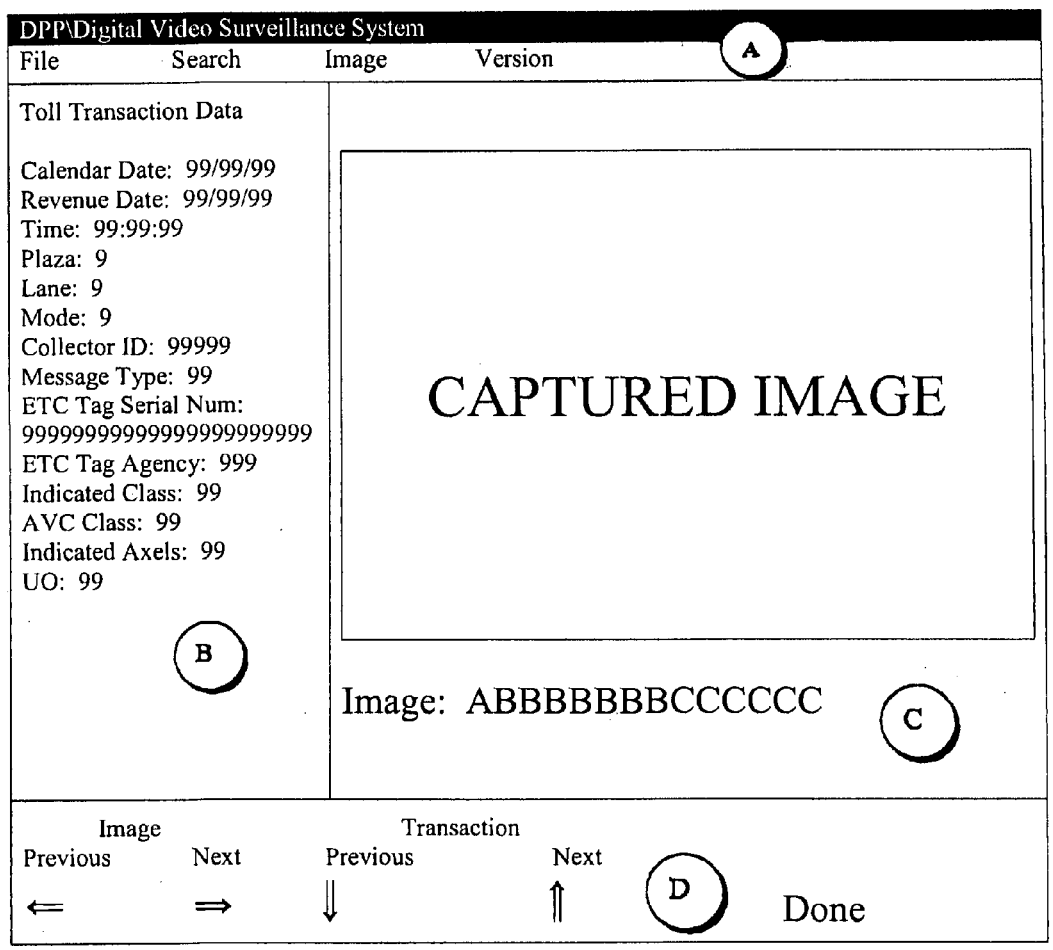
FIG. 7 is a screen shot of a Graphic User Interface (GUI) in accordance with an embodiment of the present invention.

In all search results, the data is formatted as shown in FIG. 7. Section A is a tool bar for inputting commands via a mouse. Section B displays the toll plaza data. Section C is the captured image. Section D contains more buttons for allowing user input, as will be described later.

Various combinations for searching are possible with present invention. Specific formats for retrieving data include:

1) Transaction Number;
2) Date, Lane and Time
3) Date, Collector and Time;
4) Date, Lane, Unusual Occurrence or Class Mis-match or Violation; and
5) Date, Collector, Unusual Occurrence or Class Mismatch or Violation.

After the auditor has retrieved the transaction data and the image data, he may make any needed changes to the datatable or prepare reports showing the discrepancies discovered during the audit.

Real Time Viewing

Real-time retrieval of data allows an operator to assess all of the toll plazas and cameras, preferably from one place at one time. Thus, if a camera gets knocked out of alignment, or a toll plaza fails to transmit data to the computer system 30, an operator can determine this right away and avoid warehousing a large amount of useless data, such as a camera capturing images of the sky.

As noted above, the combined plaza data is forwarded to port 30i and/or network card 30h. As the File Management System 30c builds the various fields, it formats the data into a Graphic User Interface (GUI) screen as shown in FIG. 7 when the computer system 30c is configured to forward data in real time to monitor 33.

When the computer system 30c is configured to forward the toll data and image data to an operator at client terminal 38 in real time, it merely bundles the data properly and an address or header information is placed on the data for transmission through the network 36. Located at either client terminal 39 or server 38 is a File Management System similar to 30c. This second File Management System takes the combined data and formats it into the GUI screen shown in FIG. 7.

In both real time embodiments, the File Management System 30c has an update feature that allows it to continually transmit new data as it is received. In this manner, the GUI screen displayed on either monitor 33 or client terminal 39 is continually updated as the computer system receives new data.

In addition, File Management System 30c also receives operator inputs to change the information being transmitted to either monitor 33 or the client/server combination 39/38. In this manner, if the operator is receiving real time images from camera 8a and toll information from lane 2, he may input data to either continue receiving real-time data from camera 8a but instead receive data from lane 1 or he may instead receive data from camera 8b, lane 4.

Search and Data Retrieval

Queries

Through the use of datatables 45–47, queries are performed to retrieve specific information from the database. One example of a query uses a lane number or numbers and a date or dates to retrieve specific information. An operator uses keyboard/mouse 43 or client/server combination 39/38 to make data entries into another GUI screen, described later.

If an operator is using keyboard/mouse 43 and monitor 33 to directly input and receive information from computer system 30, there is no need for him to identify the toll plaza data he is interested in. By default, all queries will go to either hard drive 30f or portable memory 30g. Both of these memories only store data related to the toll plaza computer system 30 they are connected to.

Figure 8:
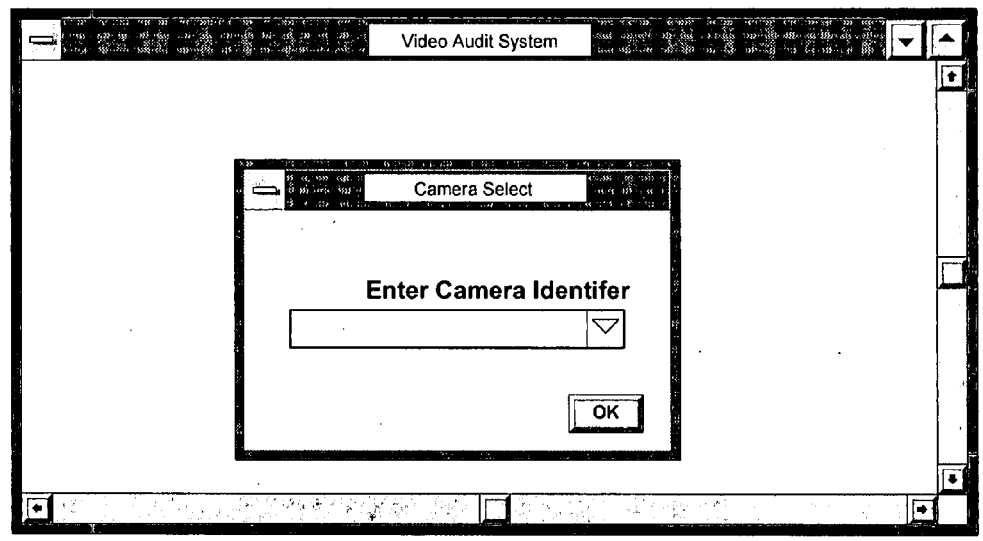
FIG. 8 is a screen shot of a camera selection menu in accordance with an embodiment of the present invention.

If a local operator is using keyboard/mouse 43 and monitor 33 to obtain remote data (i.e., from centralized database 37 or another computer system 40) or if a remote operator is using client terminal 39 to obtain data from hard drive 30f or portable memory 30g, the operator in any of these situations must first identify which toll plaza he wishes to receive data from. This is done by entering a unique camera identifier that is associated with the toll plaza using the screen shown in FIG. 8. The user makes his data entry by either accessing a drop down menu which lists all of the available camera identifiers, the toll plazas they are associated with and the lane numbers they cover and clicking on one using the mouse. Alternatively, he may type the identifier directly into the space available.

Figure 9:
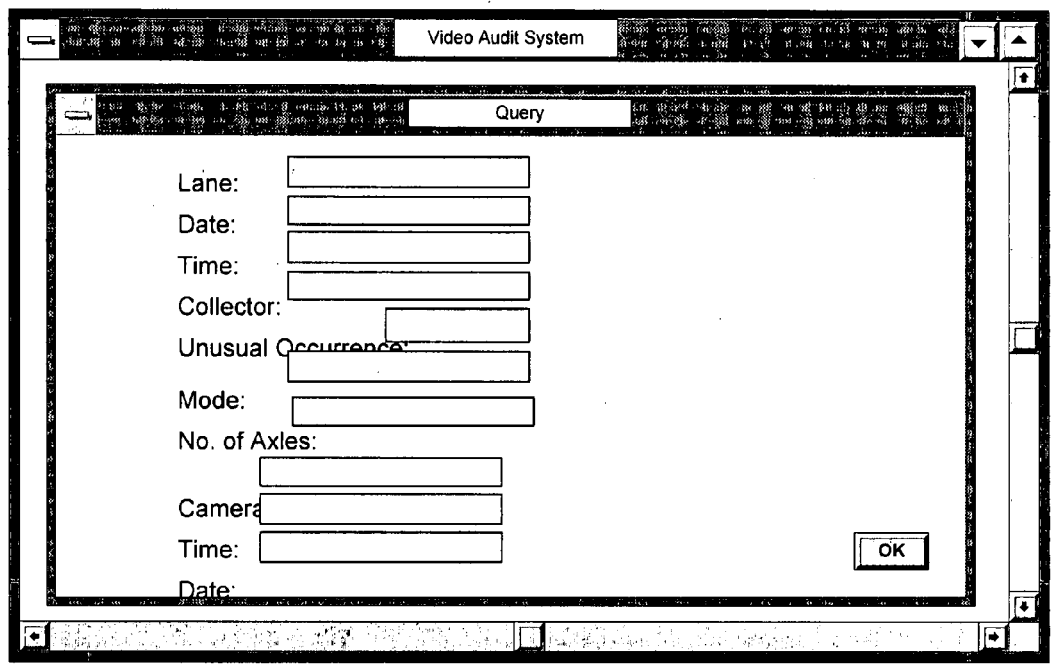
FIG. 9 is a screen shot of a query menu in accordance with an embodiment of the present invention.

After the operator has selected the desired camera, he is prompted to enter his search query via the screen shown in FIG. 9. In one example, the operator inputs a lane number and a date in the appropriate boxes on the GUI screen. The server 38 or computer system 30 issues its request to database 37 or another toll plaza 40, based on the data provided by the operator.

The database 37 or database stored on hard drive 30f or portable memory 30g returns the requested data in an organized form. An example of an organized form is to return all of the information from a query regarding transactions on a particular date in a particular lane by the time of day in increasing order from 12:00 am to 11:59 p.m. Typically, centralized database 37, hard drive 30f or portable memory 30g only forwards a block of data at a time to keep from overflowing any buffer memory. As the user views a screen and moves on, the centralized database 37, hard drive 30f or portable memory 30g forwards another block of data.

In a similar manner, an operator may query the database to obtain all images and toll data from a particular camera on a particular day. Like above, he enters data into the appropriate GUI boxes of FIG. 9 for the desired camera and date. The centralized database 37 receives this input from server 38 or computer system 30c and uses intermediate table 46 associated with the selected toll plaza to derive the lane numbers associated with the selected camera. The various lane numbers and date data are used to derive all of the requested toll plaza information from datatable 45. The centralized database 37 organizes the retrieved data using either operator defined criteria or a default criteria such as time and forwards blocks of data to the client 38 or computer system 30 where it formatted onto GUI screen 7.

Sequential Retrieval

A query typically returns a plurality of associated images and toll data. Using buttons 70 and 71 in FIG. 7, the operator may advance, in either direction, to the next or previous image in the set.

Retrieval of a plurality of images within one transaction is relatively easy. As noted above, each image is captured and stored via the unique time fields for each image. The computer system 30 increments a counter that is initiated to the time value of the first retrieved image until a time is matched that equals the time of the second image in the transaction. Alternatively, each image could be given a unique identifier that is incremented to retrieve all of the images associated with a single transaction.

Retrieval of the next or previous image when there is only one image per transaction involves extracting the time field from either datatable 45 or 47 associated with the image currently being viewed. Numbers are either added or subtracted to the extracted value and queries are performed against datatable 47 until a hit is registered. Depending on the query and the set of returned toll and image data, data is extracted from datatable 47 and used to determine lanes associated with that camera. If the lane is already known via operator input, the lane and the derived time value are queried against datatable 45 to retrieve the correct toll plaza data. Then the toll plaza and image data are properly formatted and forwarded to client 38 or monitor 33 for display.

Using buttons 72 and 73, the next transaction is retrieved. This query works similarly to that just described using buttons 71 and 72 except the system only returns data when a transaction has occurred. Referring back to FIG. 6, step S63 is optional. If removed, there is a high probability that images will be stored when tolls were not collected. This typically happens late at night when traffic volume is low. Therefore, the operator can avoid looking at stored empty transaction screens and go directly to the next image where a transaction occurred in the same lane.

Alternatively, if a search was initiated based on either an unusual occurrence, a class mis-match or a violation, the buttons 72 and 73 are used to display the next transaction and associated image in the query that had an unusual occurrence, class mis-match or violation.

In addition, if unique transaction numbers are assigned, the computer system 30 only increments through the transaction numbers to find the next transaction and its associated transaction and image data.

In addition to these functions, the GUI screen shown in FIG. 7 also includes menu functions shown in area A. Under the "File" option, the auditor loads images into a local or network drive, selects data drivers/folders to retrieve and store the images, determines the available dates and cameras for a selected drive/folder or exits the system. Under the "Search" option, the auditor may execute any of the searches using the combination of keys described above. The "Image" menu saves either the current transaction being viewed to a different folder in memory, and thereby prevent overwriting, or it saves a plurality of images and associated data both before and after the transaction being currently audited. The "Version" option displays information about the system the auditor is using.

Banking System

Figure 10:
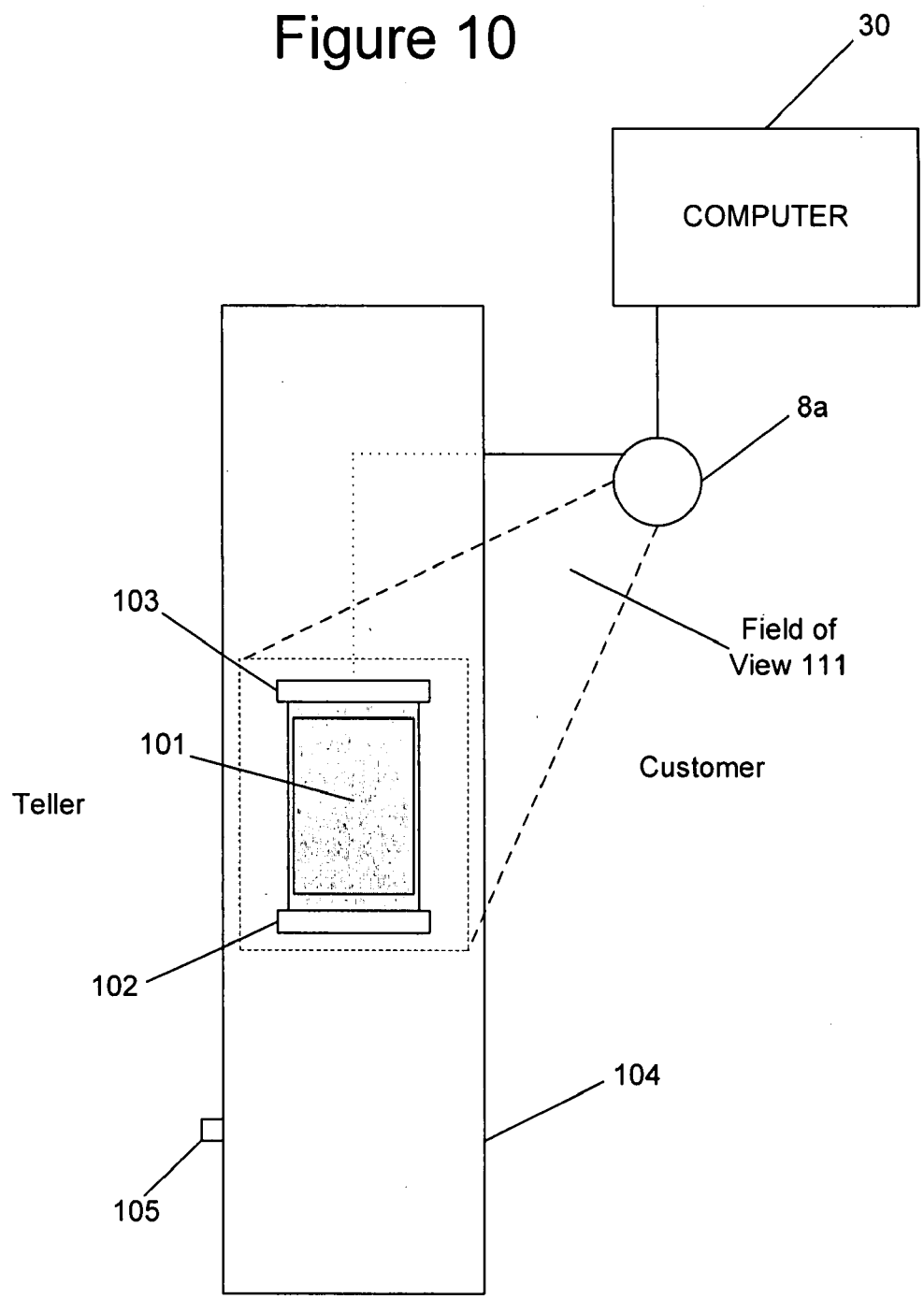
FIG. 10 is a view of the implementation of the present invention in a banking environment.

FIG. 10 shows another embodiment of the present invention. In this embodiment, images are taken of documents and money as they are exchanged between a teller and a customer. This system obviates the use of the calculators with tape outputs.

Camera 8a is a high resolution camera with a narrow view 111 over area 101. Area 101 is similar to a touch screen in that area 101 detects when a plane of light is broken and is located on counter 104. The plane of light, shown in gray, is set up by having 102 and 103 emitting light beams at each other. A light beam emitted from 102 is received and detected by 103 and vice versa in an interdigitated fashion.

A transaction typically begins whenever a customer or teller drops a piece of paper into area 101. As the paper breaks the plane of light established by 102 and 103, a trigger signal is sent to camera 8a to photograph the paper. The image is sent to computer system 30 where it is stored. Computer system 30 also stores the time and date data as well as when the image of the paper is taken along with a transaction identifier number. The image of the paper along with time and date data and transaction number data is stored in a datatable, similar to datatable 47 in FIG. 4c, so that an audit of the days transactions can be performed. After the teller receives the document from the customer, the teller places other paper such as a receipt or money, including coins, and any other items into area 101. These items break the plane of light and images of the these items are captured and stored into the datatable.

The transaction identifier number is a number generated by a counter that is used to correlate two separate images. Generally, the document given to the teller from the customer generates a first image that must be correlated to the corresponding image generated by the teller passing a document or money to the customer. For example, suppose the customer desired to cash a check. He drops the check in area 101. The check breaks the light plane established by 102 and 103 and triggers camera 8a to capture a readable image of the check. The teller removes the check and drops the money into area 101. As each bill breaks the plane of light, another image is taken. After the customer has removed his money from area 101, the teller hits a reset button 105 which increments the transaction number so the next transaction may be recorded. In this way, the video capturing of the check and the money is all associated together via the unique transaction number.

Retail Sales

Figure 11:
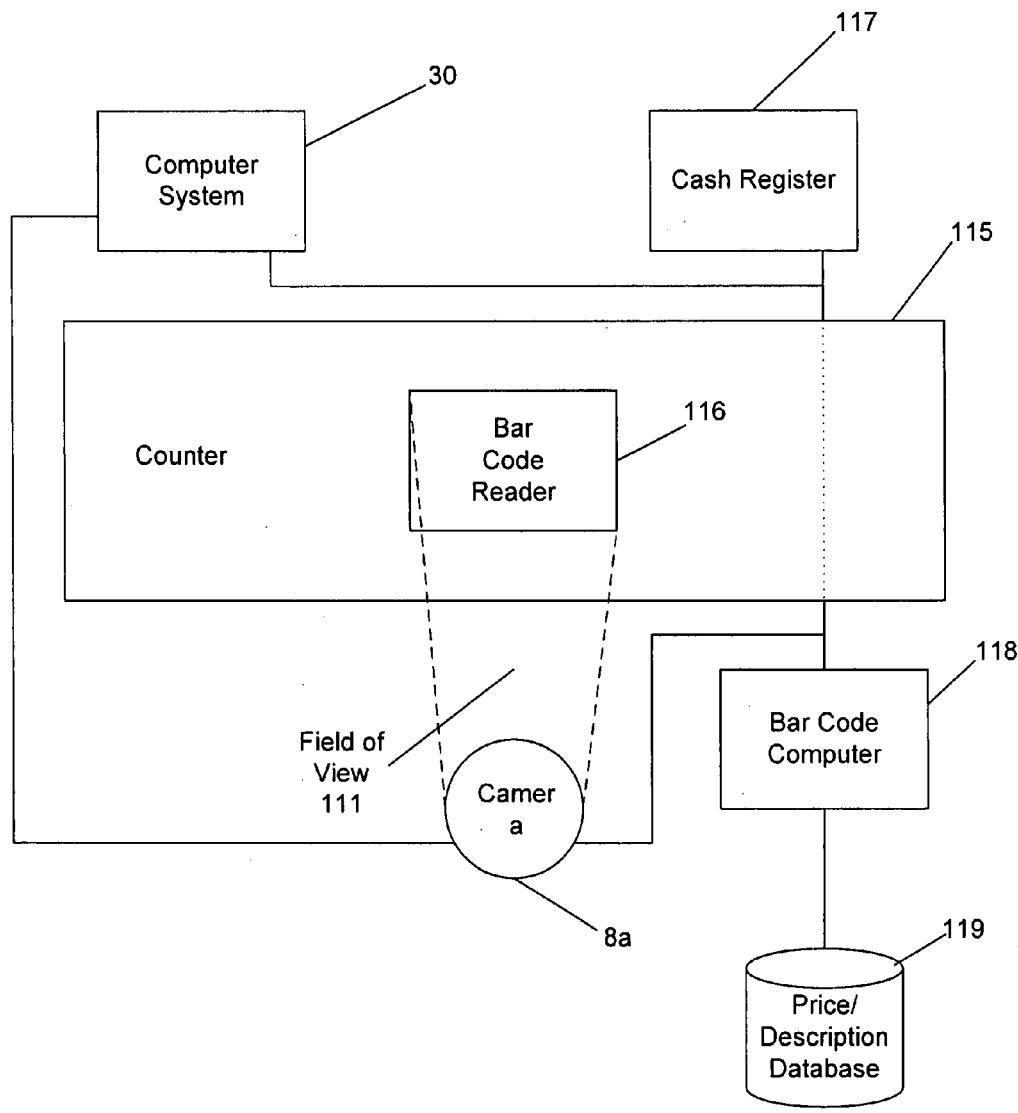
FIG. 11 is a view of the implementation of the present invention in a retail environment.

FIG. 11 shows an embodiment of the present invention for use in retail sales. A purchaser places the goods he desires to buy on counter 115. The cashier passes each item over bar code reader 116. Bar code computer 118 issues a query to price database 119 using the bar code read from the item as a key to determine the price of the item. Bar code computer 118 returns the price and the associated bar code to cash register computer system 30 where this data is inserted into the appropriate fields of the datatables. In addition, bar code computer 118 returns a brief description of the item, like Women's Sweater, with the price to cash register 117 for printing on the customer's receipt. In addition, cash register 117 adds the scanned item's price to the running total.

The bar code reader 116 also transmits a trigger signal to camera 8a so an image of the item is captured as it is scanned. The image from camera 8a is forwarded to computer system 30 for storage as described above.

FIGS. 12a–c show the datatables built by the system shown in FIG. 11. Datatable 12a contains the transaction data. Data fields include the date and time of the scanning of the item, the camera or counter number where the item is scanned, the bar code of the item scanned, its price retrieved from database 119, a cashier identifier, a transaction number, a flag to determine if the item was purchased on sale and the sale amount.

FIG. 12b shows another datatable for this embodiment of the present invention. It contains a field for transaction numbers, type of payment used by the customer (either credit card, debit card or money), the amount of the payment and the change given.

FIG. 12c shows the image datatable for this embodiment of the present invention. The fields in this datatable include the bar code number for the item scanned, the camera/counter identifier where the transaction occurs, the image itself the date and time the image is captured and the transaction number for the sale.

Like the previous embodiments already described, an auditor receives all of the transaction data and image data onto one GUI screen. The auditor may "flip" through various images and individually scanned item's transaction data to see everything a particular customer purchased, what the bar code reader indicated the bar code to be for that item, the price charged and the date and time of the transaction.

Other Databases

While the present invention has been described using a relational database, it is understood by those of ordinary skill in the art that the present invention may be equally implemented using object oriented databases, distributed databases and hierarchical databases.

One example of a distributed database keeps the transaction data separate from the image data. Referring to FIGS. 4a–4c, a distributed database would not transmit the image data to the centralized database 37 of FIG. 3. Instead, the image data would remain local at each toll plaza while the transaction data is transmitted to the centralized database 37. One reason for keeping a distributed database such as this one is to reduce the amount of traffic over the network 36. The images themselves are very large blocks of data that can take a long time to transmit. By keeping this data local, excess traffic and costs associated with transmitting large blocks of data can be eliminated.

Also, the network 36, as noted above, may not have enough bandwidth to effectively transmit the images. In an alternative embodiment, the images are stored locally on portable memory 30g and transported to an audit center. In this manner, the auditor may retrieve transaction data either from the centralized database 37 or from the specific computer system 30 via network 36, and retrieve the images from the portable memory 30g in a local memory reader located at the auditing center.

In addition, the present invention may also be implemented using an object oriented database or a hierarchical database. In addition, a hybrid database is also within the scope of the present invention. For example, the images may be stored locally in an object oriented format while the transaction data may be stored in a centralized database in a relational database.

In yet another embodiment of the present invention, the clock/calendar circuit 31 is centralized to all of the toll plazas within a state or system. In this embodiment, the local computer systems 30 receive their clock/calendar data from this centralized clock/calendar circuit via network 36 instead of the local clock/calendar circuit 31 shown in FIG. 3

While the present invention has been described above using specific examples, it should be clear to one of ordinary skill in the art that certain modifications may be made to the above description without departing from the scope of the apparent claims.

What is claimed is:

1. A system for collecting and organizing data comprising:
a video camera for capturing video images of transactions;
an input device for collecting transaction data associated with the transactions; and
a database management system for organizing the video images and the transaction data into a digital database;
wherein the video images are stored in the digital database as digital video images;
wherein the digital video images are associated in the digital database with the transaction data such that the digital video images of a transaction can be retrieved based on the transaction data of the transaction;
wherein the video camera is configured to capture a first video image during a first time period;
wherein the database management system is configured to determine, after the video camera has captured the first video image, whether or not the input device collected first transaction data of a first transaction during the first time period; and
wherein the database management system is configured to store, if determining that the input device collected the first transaction data during the first time period, the first video image in the digital database as a first digital video image associated with the first transaction data.

2. The system of claim 1 wherein the transaction data includes time data.

3. The system of claim 1 wherein the transaction data includes date data.

4. The system of claim 1 wherein the transaction data includes monetary data.

5. The system of claim 1 wherein the video images are captured based upon a clock signal.

6. The system of claim 1 further comprising:
a terminal for allowing an operator to input queries into the digital database and receive the digital video images and the transaction data in response to the queries.

7. The system of claim 1 wherein the transactions are vehicle toll collection transactions.

8. The system of claim 1 wherein the transactions are financial transactions.

9. The system of claim 1 wherein the transactions are retail transactions.

10. The system of claim 1,
wherein video images and transaction data are stored in the digital database for each of a plurality of transactions;
wherein the database management system may receive a query to search for a first subset of transaction data that have a particular characteristic; and
wherein a first subset of video images that are associated with the first subset of transaction data can be retrieved by the database management system and be arranged to be displayed in an order in response to the query.

11. The system of claim 10, wherein the particular characteristic of the first subset of transaction data is at least one of an unusual occurrence, a class mis-match, and a violation.

12. The system of claim 1,
wherein the database management system can process a query and retrieve a second digital video image in response to the query; and
wherein the second digital video image can be sent over a digital network to a client terminal for viewing.

13. The system of claim 1,
wherein the database management system is configured to discard the first video image if determining that the input device did not collect the first transaction data during the first time period.

14. The system of claim 1,
wherein the database management system is configured to not store the first video image if determining that the input device did not collect the first transaction data during the first time period.

15. The system of claim 1,
wherein the video camera is directed at a lane of vehicle traffic; and wherein the transactions are vehicle toll collection transactions.

16. A method of creating a transaction based database comprising:
   capturing an image of the transaction as the transaction occurs;
   collecting data associated with the transaction; and
   storing the image and the data into a digital database, the image stored into the digital database as a digital image associated with the data;
   wherein the image of the transaction is captured before the data associated with the transaction are collected; and
   wherein a query into the digital database using a portion of the data acts as a key for retrieving the digital image associated with the data.

17. The method of claim 16 further comprising:
   triggering the capturing of the image based on a clock signal.

18. The method of claim 16 further comprising:
   retrieving the digital image and the data from the digital database in response to the query.

19. The method of claim 18 further comprising:
   displaying the digital image and the data on a monitor for an operator to view.

20. The method of claim 19 wherein the operator makes adjustments to the data stored in the digital database.

21. The method of claim 18 further comprising:
   displaying a next digital image and associated data on the monitor in response to the operator issuing a request to view the next digital image.

22. The method of claim 18 further comprising:
   displaying a next digital image and associated data on the monitor in response to the operator issuing a request to view a next transaction in time.

23. The method of claim 18 further comprising:
   displaying a next digital image and associated data on the monitor in response to the operator issuing a request to view a next transaction with a particular value in a particular data field.

24. A method for creating a transaction based database, the method comprising the steps of:
   capturing a video image during a time period;
   determining, after the video image has been captured during the time period, whether or not a transaction occurred during the time period;
   saving the video image in the transaction based database determining that the transaction occurred during the time period;
   saving transaction data associated with the transaction in the transaction based database in the event that the transaction occurred during the time period; and
   associating the video image with the transaction data in the transaction based database if determining that the transaction occurred during the time period.

25. The method of claim 24, wherein the step of capturing a video image during a time period, comprises the step of:
   capturing a video image during a time period in response to a clock signal.

26. The method of claim 24, further comprising the step of:
   retrieving at least one of the video image and the transaction data in response to a query.

27. The method of claim 24, wherein the step of saving the video image, comprises:
   saving the video image in the transaction based database only if determining that the transaction occurred during the time period.

28. The method of claim 24, wherein the step of saving the video image, comprises:
   saving the video image in the transaction based database if determining that the transaction occurred during the time period; and
   discarding the video image if determining that the transaction did not occur during the time period.

29. A method for displaying video images related to transactions, the method comprising the steps of:
   capturing video images for each of a plurality of transactions;
   collecting transaction data for each of the plurality of transactions;
   associating the video images for each of the plurality of transactions with the transaction data of the corresponding transaction;
   retrieving, in response to a query that indicates a particular transaction data characteristic, a subset of the video images that are associated with transaction data having the particular transaction data characteristic; and
   displaying the retrieved subset of the video images in an order;
   wherein the video images for each of the plurality of transactions are captured before the transaction data of the corresponding transaction are collected.

30. The method of claim 29, wherein the step of retrieving, in response to a query that indicates a particular transaction data characteristic, a subset of the video images that are associated with transaction data having the particular transaction data characteristic, comprises the step of:
   retrieving, in response to a query, a subset of the video images that are associated with transaction data reflecting at least one of an unusual occurrence, a class mis-match, and a violation.

31. A method for displaying video images related to transactions, the method comprising the steps of:
   capturing video images for each of a plurality of transactions;
   collecting transaction data for each of the plurality of transactions,
   associating the video images for each of the plurality of transactions with the transaction data of the corresponding transaction;
   retrieving, in response to a query that indicates a particular transaction data characteristic, a subset of the video images that are associated with transaction data having the particular transaction data characteristic; and
   displaying the retrieved subset of the video images in an order;
   wherein the video images for each of the plurality of transactions are captured either before the transaction data of the corresponding transaction are collected or at a same time that the transaction data of the corresponding transaction are collected; and
   wherein the step of displaying the retrieved subset of the video images in an order, comprises the step of:
      displaying the retrieved subset of the video images in chronological order according to when the transactions associated with the video images occurred, the retrieved subset of the video images displayed without any intervening images.

* * * * *